US008462205B2

(12) United States Patent
Soler

(10) Patent No.: US 8,462,205 B2
(45) Date of Patent: Jun. 11, 2013

(54) LANDING AID DEVICE AND METHOD

(75) Inventor: Michel Soler, Carbon-Blanc (FR)

(73) Assignee: Thales, Neuilly-sur-Siene (FR)

( * ) Notice: Subject to any disclaimer, the term of this patent is extended or adjusted under 35 U.S.C. 154(b) by 368 days.

(21) Appl. No.: 12/821,843

(22) Filed: Jun. 23, 2010

(65) Prior Publication Data

US 2010/0321488 A1 Dec. 23, 2010

(30) Foreign Application Priority Data

Jun. 23, 2009 (FR) ..................................... 09 03041

(51) Int. Cl.
*H04N 7/00* (2011.01)

(52) U.S. Cl.
USPC .......................................... 348/115; 348/117

(58) Field of Classification Search
USPC ................................................. 348/115, 135
See application file for complete search history.

(56) References Cited

U.S. PATENT DOCUMENTS

| | | | | |
|---|---|---|---|---|
| 4,554,545 | A | 11/1985 | Lowe | |
| 5,745,863 | A * | 4/1998 | Uhlenhop et al. | 701/14 |
| 2004/0217883 | A1 | 11/2004 | Judge et al. | |
| 2005/0232512 | A1 * | 10/2005 | Luk et al. | 382/276 |

FOREIGN PATENT DOCUMENTS

| | | |
|---|---|---|
| WO | 96/38831 | 12/1996 |
| WO | 0054217 | 9/2000 |
| WO | 2009010969 | 1/2009 |

* cited by examiner

*Primary Examiner* — Mehrdad Dastouri
*Assistant Examiner* — Jared Walker
(74) *Attorney, Agent, or Firm* — Baker & Hostetler LLP

(57) ABSTRACT

A landing aid device for an aircraft generates video images of a portion of the field of vision using a sensor situated in front of the aircraft intended for picture-taking during poor visibility conditions, and extracts contours from the video images making it possible to delimit at least one first known shape included in each image. A first head up display includes a display zone, which occupies a portion of the visor of the cockpit superimposed on the exterior landscape, and a symbology for generating information representing symbols intended to aid piloting is displayed on the display, wherein at least one first symbol comprising landing aid information is generated on the basis of the contours of the first shape and displayed on the display.

11 Claims, 3 Drawing Sheets

LANDING AID DEVICE AND METHOD

CROSS-REFERENCE TO RELATED APPLICATIONS

This application claims priority to foreign French patent application No. FR 0903041, filed on Jun. 23, 2009, the disclosure of which is incorporated by reference in its entirety.

FIELD OF THE INVENTION

The present invention relates to the field of landing aid devices, notably devices making it possible to interactively indicate information aiding the visibility of the exterior world, notably relating to the position of the runway and to the altitude of the aircraft.

BACKGROUND OF THE INVENTION

Currently, numerous aircraft use piloting aid devices making it possible to facilitate the interpretation of data related to the aircraft, to the ground or to the environment in which the aircraft is deploying.

For example, a system commonly used in certain aircraft under the acronym HUD, standing for "Head Up Display" in aeronautical terminology, makes it possible to display flight information superimposed on the landscape seen through the windscreen of the cockpit. It makes it possible to facilitate certain critical phases of flight, notably landings.

The computation and representation of symbols, also called symbology in aeronautical terminology, presented to the pilot superimposed on the landscape is commonly used.

In order to improve the exterior view from the cockpit, when visibility conditions are poor, a sensor located in the aircraft's nose can provide an image of video type presented in the HUD. This image constitutes a piloting aid which is particularly helpful notably during an approach phase. It makes it possible to improve the interpretations of the landscape and the recognition of certain zones. It therefore constitutes an enhancement of safety in landing phases for example.

Furthermore, the video image makes it possible to delay the point from which fly by sight is considered to be necessary notably during a landing. This point is called the "point of vision" in the subsequent description. From the piloting point of view, the pilot can decide later on about a landing if the conditions so permit.

Increasing the duration for which the pilot expects to have visibility of the runway by sight makes it possible to approach close to the runway and to obtain a greater chance of having a clear field of vision in proximity to the runway, for example in the case of bad weather.

If the pilot cannot see the runway at the point of vision then he is obliged not to land under these conditions. The presence of a video image allows the pilot to push back in time, therefore to a lower altitude, the position of the point of vision in his approach procedure.

A sensor providing a video image of this type is known in aeronautics by the acronym EVS standing for "Enhanced Vision System" in aeronautical terminology.

The EVS is a camera of mono-band or multi-band infrared type having the ability to see "better" than the human eye in conditions of low brightness, typically during night flights or poor weather, such as the presence of fog or smoke.

This sensor is generally located in the aircraft's nose and has a field of vision positioned in a similar manner to that of the HUD.

This EVS system is generally coupled to the HUD for certain applications notably in the approach phase so as to improve visibility in the field of vision. It therefore makes it possible to obtain better operational minima, such as the minimum altitude at which a landing decision does or does not have to be taken.

An advantage of the image provided by the EVS is that it is of video type, that it covers the whole of the field of the HUD and that it is presented superimposed on the HUD symbology.

Although this synthetic vision, which is fairly close in terms of rendition to real vision, facilitates the perception of the exterior world in poor meteorological conditions, drawbacks remain.

Among them, the enhancement afforded by this piercing vision is counteracted by the overload of the image provided above the true landscape.

This renders the image almost unusable and may generate confusion of interpretation between the real world and the EVS imaging notably during the required identification of exterior elements in the final landing procedure. The pilot must perform a go-around if the visibility does not make it possible to identify the elements necessary for landing, such as the threshold of the landing runway for example.

Document WO00/54217 is known from the prior art. This document describes an HUD display device on which images originating from several measurement sources can be displayed separately or at the same time by merging the captured images. This document discloses a scheme for creating an improved synthetic image by virtue of contour detection processing. According to this solution, the aim of the means for generating an image is to create a more complete image than that captured or an entirely synthetic image representing the landscape background. The major disadvantage of this solution is the problem of overload of the displayed image.

The invention makes it possible to alleviate the aforesaid drawbacks.

SUMMARY OF THE INVENTION

The invention makes it possible to generate a symbology extracted from the video images and superimposed on the landscape seen through the cockpit. The invention makes it possible to extract a symbology on the basis of a high-quality video image used notably during reduced visibility in an approach trajectory. The invention makes it possible to correlate the information extracted with a geographical database, for example a navigation database. The information represented by the symbols generated by the device of the invention is therefore verified and displayed, thus constituting a safety enhancement and a landing aid.

The invention makes it possible to alter the representation of the symbology according to the chronology of the various flight phases during an approach so as to inform the pilot thereof.

Advantageously a symbol extracted from a video image of EVS type is a landing runway contour.

Advantageously, the landing aid device for aircraft comprises:

- means for generating video images of a portion of the field of vision, the device comprising a sensor situated in front of the aircraft intended for picture-taking during poor visibility conditions;

means for extracting contours of video images delivered by the means for generating images making it possible to delimit at least one first known shape included in each image;

a first display, termed "head-up", whose display zone occupies a portion of the visor of the cockpit superimposed on the exterior landscape;

means for generating a symbology generating information representing symbols intended to aid piloting and displayed on the display.

Advantageously, at least one first symbol comprising landing aid information is generated on the basis of the contours of the first shape and displayed on the display.

Advantageously, the sensor may be an infrared camera or a millimetric radar making it possible to capture images in an environment where the visibility is degraded.

Advantageously, the first shape is a trapezoidal and the first symbol generated is the contour of a landing runway.

Advantageously, the device comprises means for validating and comparing the integrity of the data describing the first symbol with data of a geographical data resource.

Advantageously, the geographical data resource may be:

a navigation database; or a set of satellite images; or a terrain database computer; or an airport database describing the various elements of an airport.

These various data resources may also be combined.

Advantageously, the landing aid device for aircraft comprises means of graphical modification of the displayed symbols. The device comprises a radioaltimeter continuously delivering the altitude of the aircraft allowing the means of graphical modification to modify the appearance of the first symbol displayed as a function of the altitude of the aircraft.

Advantageously, the display displays the first symbol superimposed on a second landing runway symbol generated by the geographical data resource.

Advantageously, the first symbol comprises two graphical states of which:

the first state is a solid trapezoidal filling the interior of the second symbol, the symbol being displayed between a first given and a second given altitude;

the second state is the contour of a trapezoidal runway, of the same shape as the second symbol and smaller so that it is inserted inside the second symbol, the said symbol being displayed between the second altitude and a third given altitude.

Advantageously, the device comprises a switch making it possible to choose automatically or manually to display either the images delivered by the means for generating images, or to display the symbology extracted from the images delivered by the means for generating images.

Advantageously, the landing aid method for aircraft is implemented by the device of the invention, the said method comprises:

a first step of extracting a contour of the runway on the basis of a video image delivered by the means for generating images;

a second step of generating the first symbol defining a runway on the basis of means for extracting a first trapezoidal shape from the video images;

a third step of comparing the first symbol with data of a geographical database, the comparison giving a first integrity condition for the data;

a fourth step, carried out according to the value of the first condition, of displaying the first symbol on a display;

a fifth step of comparing at least one predefined altitude and the aircraft altitude delivered by a radioaltimeter, in such a way that when the aircraft crosses the predefined altitude, the graphical state of the first symbol changes indicating the crossing of the said altitude to the pilot.

BRIEF DESCRIPTION OF THE DRAWINGS

Other characteristics and advantages of the invention will become apparent with the aid of the description which follows, given in regard to the appended drawings which represent.

DETAILED DESCRIPTION

Figure 1:
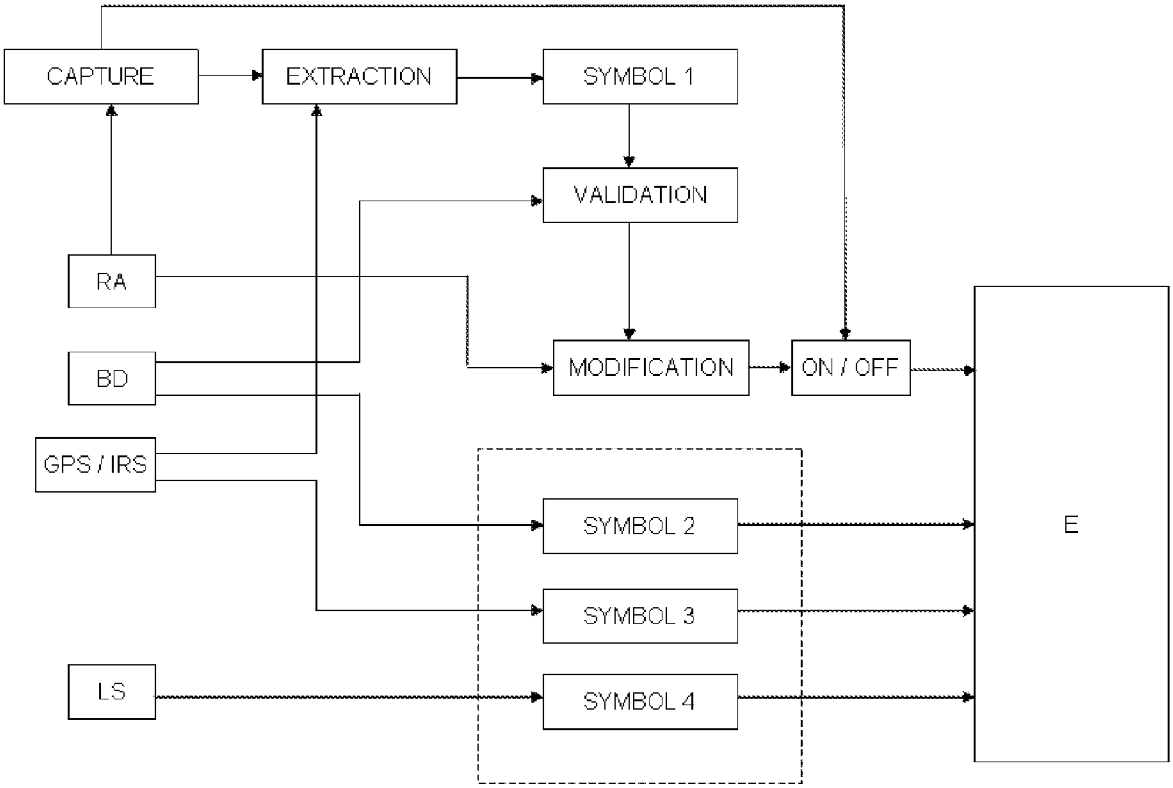
FIG. 1: a functional diagram of the generation of a symbology for aiding landing according to the invention.

FIG. 1 represents the various functional blocks of the device of the invention.

In the subsequent description we will call either a computer or an application carrying out a determined function "a component".

A component, denoted CAPTURE, makes it possible to acquire the video images of a sensor generally placed level with the nose of the aircraft. The sensor delivering the video images to the CAPTURE component can be a device such as the EVS.

The video images captured by the CAPTURE component are transmitted to a contour extractor, denoted EXTRACTION, this possibly being a dedicated computer or a computer already present in an aircraft's system avionics.

The EXTRACTION component makes it possible notably to dimension an appropriate field of vision suitable for the extraction of landing-specific elements. For this purpose it is possible to define a field of vision comparable with that which is defined in the HUD for example or of any so-called "head-up" display device. Furthermore, the EXTRACTION component makes it possible to silhouette each exterior distinctive element captured in the field of vision so as to extract the contours therefrom. The shapes thus silhouetted are compared with known shapes generated on the basis of the navigation database or on the basis of a source of geo-location data such as a GPS or else on the basis of another source of data not originating from the video image captured by the CAPTURE component and making it possible to identify a determined element.

On the basis of the contours generated by the EXTRACTION component and selected which will be preserved, a component, denoted SYMBOL 1, which may possibly be a dedicated computer or be identical to the EXTRACTION computer or else a computer already present in the aircraft's avionics system, makes it possible to generate a symbology.

The extraction of the contours of the images originating from the CAPTURE component can start automatically at a programmed altitude or be activated manually by the pilot.

The contour extraction zones are defined on the basis of avionics information available aboard the aircraft in equipment such as the FMS, standing in aeronautical terminology for "Flight Management System" or else an inertial platform such as an IRS, the acronym standing for "Inertial Reference System". This information allows computation of relative positioning of the aircraft with respect to the target terrain and estimation of the contour extraction zone to which the EXTRACTION component must proceed.

In one embodiment, a determining element of the exterior field whose visual recognition by the pilot is necessary for landing is the landing runway.

In this example, the extraction of contours is done on the basis of the search for a trapezoidal shape corresponding to the representation of a runway seen in 3D. The extraction of the shape can be carried out with an optional standard runway shaping. Two examples of known landing runway dimensions are 45 m×3000 m or 60 m×4000 m. Nonetheless, the invention applies to all shapes of landing runways as long as they are known.

The real-time computation performed by the EXTRACTION component takes into consideration the relative positioning of the aircraft with respect to the target. In the embodiment relating to the extraction of the shape of a runway, the positions of the aircraft and of the runway are delivered by equipment of the avionics system, such as the GPS computer, the navigation database or the airport database or yet other location or radio navigation systems.

Figure 3:
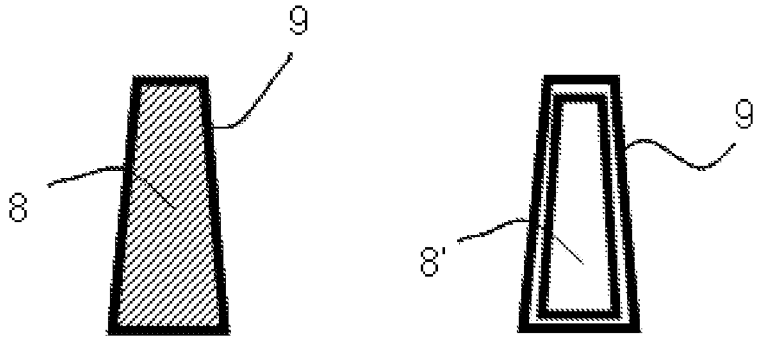
FIG. 3: the superposition of a symbology originating from the aircraft's database and that generated on the basis of a camera.

On the basis of the video image captured by the CAPTURE component, the SYMBOL 1 component generates a symbol of a landing runway, denoted RUNWAY 1, of which a shape can be represented in FIG. 3. The invention makes it possible to generate a trapezoidal shape similar to that usually displayed by the HUD on the basis of the navigation database.

In the subsequent description, an HUD will denote a head-up display device such as the HUD or an equivalent.

An advantage of such a generated shape is that it is easily identifiable by the pilot and that it can be easily compared with the symbol of the runway generated by the navigation database, denoted RUNWAY 2, and displayed in the HUD. For example, a simple means of comparing them is to display them in one and the same reference frame, notably an aircraft reference frame in the case of the HUD symbology, where the axis of the runway can be compared with the heading of the aircraft.

In another embodiment, the RUNWAY 1 symbol can be compared with a runway symbol generated on the basis of onboard data of terrain representations, such as the system known in aeronautics by the acronym TAWS or else an Airport database defining the coordinates of the landing runway as well as these dimensions.

In other embodiments, the RUNWAY 1 symbol can be compared with a runway symbol generated on the basis of non-onboard data such as the data of an electronic map accessible through ground/air links, for example a link known by the name SATCOM in aeronautical terminology.

A VALIDATION component makes it possible to compare the two symbols RUNWAY 1 and RUNWAY 2, notably their similarity and their position in one and the same reference frame. The computations of correlation between the two symbols can be performed on the basis of the contours of the runways generated by the displayed symbology. Notably, the correlation can integrate the width of the runway, the length of the runway, the axis of the runway. In one embodiment, the correlation computations can advantageously be performed in a geodesic reference frame of the various databases generating the RUNWAY 2 symbol or in another embodiment in a reference frame tied to the aircraft, for example that of the HUD.

Thus, if the two symbols are superimposed, there is indeed a consistency of data originating from two different sources, namely the navigation database or another database and the data originating from the video capture of the CAPTURE component.

The criteria of displays are determined on the basis of a given tolerance which may pertain to the comparison of the two symbols and of a tolerance of the dimensions on either side computed.

In various embodiments, the data determining the RUNWAY 1 symbol may be correlated with data originating from various radio navigation sensors.

The VALIDATION component may be a dedicated computer or identical to the SYMBOL 1 computer or else a computer already present in the avionics system of the aircraft.

The VALIDATION component makes it possible to verify and validate the consistency of the data relating to the position of the runway in space and its relative position with respect to the heading of the aircraft.

A MODIFICATION component makes it possible to carry out the changes of state of the RUNWAY 1 symbol. The symbol of the runway having as first objective to represent the direction of the runway in relation to the heading of the aircraft and to compare it with the RUNWAY 2 symbol.

A second objective of the RUNWAY 1 symbol according to the invention is to be able to represent the various states of the approach phase, notably as regards the altitude of the aircraft and of the crossing of certain critical points of the approach phase. In this case the MODIFICATION component is coupled with a radioaltimeter, denoted RA in FIG. 1.

A switch denoted ON/OFF makes it possible to activate or to deactivate the video display on the HUD and/or the symbology extracted from the video images captured.

Thus it is possible to display the video images captured on the HUD, or else to display the symbology extracted from this video or both, the display of the images and/or of the symbology being superimposed on the exterior field of vision from the cockpit.

This display is carried out by the component E of FIG. 1. This component displays the symbology originating from various resources of the aircraft's avionics system, generally these resources are radio navigation computers and sensors. For example, some of these data are aircraft attitude and positioning data originating from the GPS/IRS component, or data originating from the navigation database, denoted BD, such as the RUNWAY 2 symbol or else data of the component denoted LS in FIG. 1.

The component LS can comprise avionics equipment such as an ILS receiver, standing in aeronautical terminology for "Instrument Landing System" or an FLS standing in aeronautical terminology for "FMS Landing System" or a GLS standing in aeronautical terminology for "GPS Landing System" or an MLS standing in aeronautical terminology for "Microwave Landing System", the said equipment delivering information relating to the approach and landing scheme.

The invention allows the generation and the presentation of a new symbol displayed in the HUD which will allow the pilot to use images produced by a sensor's function such as that of the EVS within the framework of current procedures.

The invention makes it possible to alter from a graphical point of view throughout the approach the symbols generated by the SYMBOL 1 component, such as the RUNWAY 1 symbol. The changes of graphical states of the symbols inform the pilot of the functional status of the aircraft and of the situation thereof in the approach trajectory, doing so without image overload. It also informs him of the aircraft's altitude and of the crossing of certain critical points in the approach trajectory.

The changes of graphical states of the symbols, originating from the data of the CAPTURE component, integrate a concept of time during the aircraft's approach phase.

Notably, certain critical altitudes are regulated in the landing decision taken by the pilot. A benchmark altitude is notably defined starting from the moment the EVS data must be displayed in order to continue the approach phase. Notably, the runway must be able to be seen by the pilot beyond the defined benchmark altitude. It is generally defined by a regulation. This point allows the aircraft to descend in altitude and to push back the moment of a decision to land or not.

The invention therefore presents an advantage of being able to extract information from the images originating from the EVS device without overloading the remainder of the field of vision covered by the HUD, the field of vision comprising the real view seen through the windscreen of the cockpit and the images of the EVS device displayed superimposed on the real view.

An advantage of the invention is to allow switching between the symbology extracted from the video image of a device such as the EVS and the video images themselves originating from this device. The pilot can choose between the display on the basis of the ON/OFF component. This switching can be carried out manually and facilitates the identification of the visual markers without information overload.

A practical case of use can be triggered when the visibility is completely obstructed by one or more clouds, the ON/OFF switch is positioned so as to let through the video images originating from the CAPTURE component. In this case the video images are not in conflict with the representation of the exterior landscape which is covered by the clouds.

On the other hand, when the visibility is partially obstructed by bad weather, the video images will overlap parts of the landscape which are seen through the cockpit and may constitute a significant inconvenience for the pilot. In the latter case, the switch can filter the video images originating from the CAPTURE component and allow display of the symbology extracted from the video images originating from the MODIFICATION component.

An advantage of the representation of symbols, according to the invention, extracted from the image capture device such as the EVS and displayed on the HUD, is that in case of non-integrity of the data correlated by the VALIDATION component, the display of the symbols extracted from the CAPTURE component can be automatically or manually suspended.

The presentation of the symbol generated on the basis of the SYMBOL 1 component according to the invention can be either displayed or computed and not displayed. The representation of symbols generated by the SYMBOL 1 component may be similar to symbols already generated by other equipment, such as the landing runway. The VALIDATION component verifies the integrity of the data originating from various items of equipment with the data of the CAPTURE component. This verification allows the pilot to obtain an enhancement to safety as regards the information displayed in the HUD.

In other embodiments, the symbols generated by the SYMBOL 1 component may be different from the symbology already present in the HUD or may comprise messages indicating good or poor operation.

Figure 2:
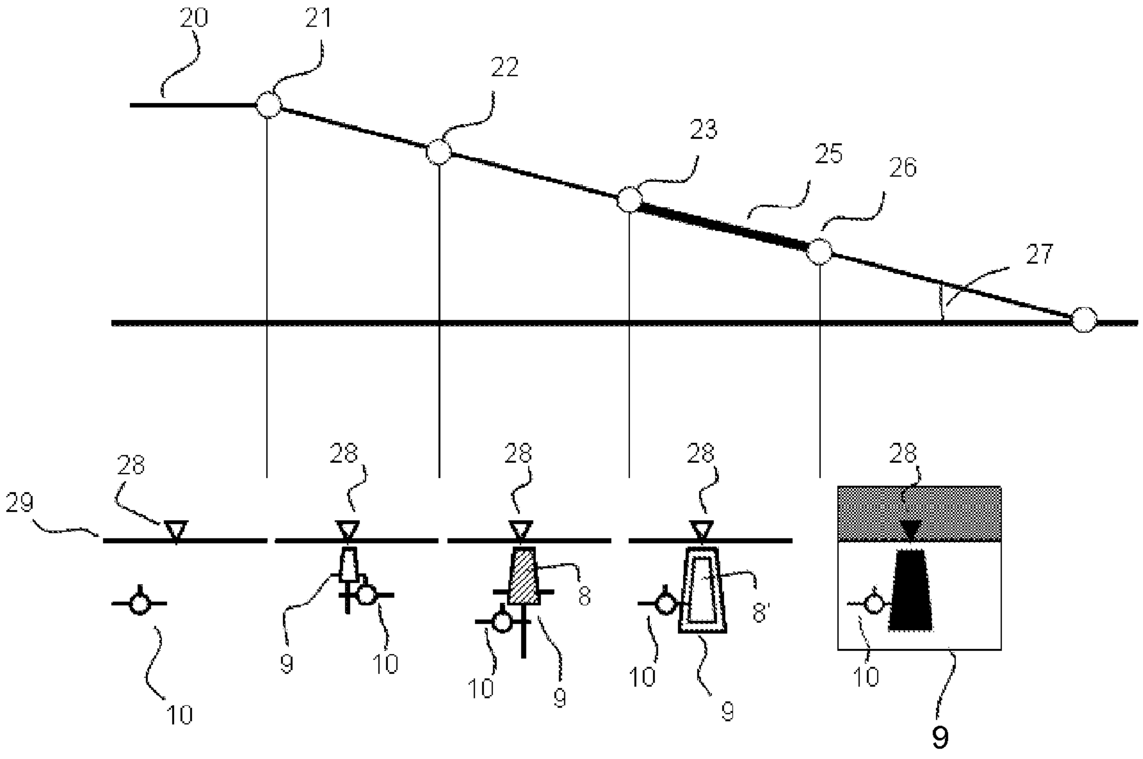
FIG. 2: the symbology generated by the device of the invention in the various approach phases.

FIG. 2 represents various phases of an approach trajectory of an aircraft getting ready to land.

The aircraft in the portion 20 of its flight plan is in cruising flight. The symbology displayed in this phase corresponds to an HUD symbology comprising inter alia the display of a speed vector of the aircraft 10, the horizon line 29 as well as a cursor 28 corresponding to the heading to be followed in the flight plan.

A first point 21 intercepted or crossed by the aircraft makes it possible to define the trajectory portion from which a display of the runway 9 is carried out and generated on the basis of radionavigation data or of data of the navigation database. The symbol of the runway, previously denoted RUNWAY 2, is displayed on the HUD in the same reference frame as the symbology representing the horizon line and the aircraft.

A second point 22 delimits the portion lying between the points 21 and 22 and in which the aircraft and the pilot navigate on the basis of the conventional symbology displayed in the HUD.

The invention makes it possible to define a point 22, situated at a given altitude and situated on the aircraft's flight plan. The point 22 defines a limit from which the EXTRACTION component begins to extract the contours of the images originating from the CAPTURE component.

The extraction can be controlled automatically on the basis of a given altitude for example on the basis of information originating from the radioaltimeter or it can be engaged manually by the pilot.

A point 23, denoted the point of vision, delimits a portion between the point 22 and the point 23 of the flight plan or of its vertical profile, in which a new symbol 8 according to the invention is generated. In the example of FIG. 2, the new symbol is a runway 8 represented superimposed on the symbol 9 already present.

In the example, the graphic of the symbol 8 is a solid runway, it is the RUNWAY 1 symbol previously described. The filling in of the RUNWAY 1 symbol presents the advantage of intuitively conveying a significant item of information of the video images, namely the landing runway, and moreover it presents the advantage of confirming in a simple manner the contour extraction process state.

On the basis of the point 23, the regulations allow an aircraft comprising an activated EVS-type device to descend below a given altitude corresponding to the altitude of the point 23 down to a limit altitude defined by the altitude of a point 26 of FIG. 2.

With a device of EVS type, the point of vision 23 can be pushed back to a new point of vision 26 since the EVS device allows better visibility.

Conversely, if the EVS does not present a correct view of the landing runway or a representation of the absolute data or data relating to the aircraft as regards its position at the level of the point 26, the aircraft must go around.

The decision to be able to descend beyond the point 23 and to fly a portion 25 delimited by the points 23 and 26 is therefore made on the presence or otherwise of the RUNWAY 1 symbol corresponding to the contour of the runway of the images captured by the CAPTURE component.

The RUNWAY 1 symbol can then, in the portion 25, be graphically represented in a way other than in the portion preceding the point 23.

For example in FIG. 2, the RUNWAY 1 symbol is a runway 8' contained in the RUNWAY 2 symbol when the aircraft flies the portion 25. The superposition of the two runways always indicates that the data are intact and the change of graphical state of the RUNWAY 1 symbol indicates that the aircraft is in a critical phase corresponding to the portion 25 involving a decision being taken by the pilot at the point 26.

The guidance in the portion 25 is done solely on the basis of the information provided by the EVS device or an equivalent device such as the CAPTURE component. This information complies with regulations which define benchmark altitudes.

The symbology extracted from the video images of the CAPTURE component ensures continuity with the previous phase and is consistent with the procedures and the symbology generally used for the approach phases.

From the point 26, the altitude at which a decision must be taken by the pilot on the basis of the information provided by the EVS device, any symbology defining a runway must be deleted for an acquisition of external markers otherwise the pilot is obliged to activate the go-around.

Finally, the end of the approach phase is generally concluded with a fly by sight phase until the wheels touch down on the landing runway, using the HUD symbology on the basis of the speed vector symbol.

FIG. 3 represents various graphical states of the RUNWAY 1 symbol. In a first case, the symbol 30 representing the RUNWAY 1 symbol is solid and situated inside the RUNWAY 2 symbol. This representation indicates that there is indeed consistency of the data provided from various avionics systems and it makes it possible to pinpoint the aircraft in one of the portions of the approach trajectory. In the example of FIG. 2, this representation allows the pilot to visually interpret that the aircraft is between the point 22 and the point 23 and that it has not yet reached the critical altitude of the point 23.

In another mode of representation of FIG. 3, the RUNWAY 1 symbol is represented by a trapezoidal shape 8' situated inside the RUNWAY 2 symbol. This representation makes it possible to be certain of the consistency of the data provided from various avionics systems and it makes it possible to pinpoint the aircraft in one of the portions of the approach trajectory. In the latter case the symbol 8' makes it possible to advise the pilot that the aircraft is between the point 23 and the point 26 in the portion 25.

An advantage of the invention is that it allows intuitive reading of the information displayed. The symbols extracted from the SYMBOL 1 component make it possible, in the case of poor visibility, to be certain of the consistency of the information originating from various resources of the avionics system notably as regards the absolute position of the runway, the relative position of the runway with respect to the aircraft and of its axis.

Moreover, another advantage is that the invention makes it possible to tailor various representations of the symbol informing the pilot or pilots of which phase the aircraft is in.

Finally the invention makes it possible not to overload the landscape seen through the windscreen of the cockpit with video images. The symbology extracted gives the useful information necessary to descend to a lower altitude while preserving the reading of the exterior landscape.

What is claimed is:

1. A landing aid device for aircraft, comprising:

means for generating video images of a portion of the field of vision, the device comprising a sensor situated in front of the aircraft intended for picture-taking during poor visibility conditions;

means for extracting contours of video images delivered by the means for generating images making it possible to delimit at least one first known shape included in each image;

a first head up display having a display zone which occupies a portion of the visor of the cockpit superimposed on the exterior landscape;

means for generating a symbology for generating information representing symbols intended to aid piloting and displayed on the head up display, wherein a first symbol comprising landing aid information is generated on the basis of the contours of the first known shape and displayed on the display;

a geographical data resource having means for generating a second symbol comprising landing aid information, wherein the geographical data resource includes means for validating and comparing the integrity of data describing the first symbol with data from the geographical data resource;

wherein the first known shape is a trapezoidal and the first symbol generated is the contour of a landing runway, the first symbol having two graphical states:

a first state displayed when the aircraft is between a first given altitude and a second given altitude, wherein the first symbol is a solid trapezoidal filling the interior of the second symbol; and a second state displayed when the aircraft is between the second altitude and a third altitude, wherein the first symbol has the same shape as the second symbol except smaller and is inserted inside the second symbol.

2. The landing aid device for aircraft according to claim 1, wherein the sensor is an infrared camera making it possible to capture images in an environment where the visibility is degraded.

3. The landing aid device for aircraft according to claim 1, wherein the sensor is a millimetric radar.

4. The landing aid device for aircraft according to claim 1, wherein the geographical data resource is a navigation database.

5. The landing aid device for aircraft according to claim 1, wherein the geographical data resource is a set of satellite images.

6. The landing aid device for aircraft according to claim 1, wherein the geographical data resource is a terrain database computer.

7. The landing aid device for aircraft according to claim 1, wherein the geographical data resource is an airport database describing the various elements of an airport.

8. The landing aid device for aircraft according to claim 1, further comprising means of graphical modification of the displayed symbols, comprising a radioaltimeter for continuously delivering the altitude of the aircraft allowing the means of graphical modification to modify the appearance of the first symbol displayed as a function of the altitude of the aircraft.

9. The landing aid device for aircraft according to claim 1, wherein the display displays the first symbol superimposed on a second landing runway symbol generated by the geographical data resource.

10. The landing aid device for aircraft according to claim 1, wherein the device further comprises a switch making it possible to choose automatically or manually to display either the images delivered by the means for generating images, or to display the symbology extracted from the images delivered by the means for generating images.

11. A landing aid method for aircraft implementing the landing aid device according to claim 1, the method comprising:

a first step of extracting a contour of a runway from a video image delivered by the means for generating images;

a second step of generating a first symbol defining a runway on the basis of means for extracting a first trapezoidal shape from the video images;

a third step of comparing the first symbol with data of a geographical database, the comparison giving a first integrity condition for the data;

a fourth step, carried out according to an acceptable value of the first integrity condition, of displaying the first symbol with a superimposed second symbol on a display, the superimposed second symbol indicating the acceptable value of the first integrity condition;

a fifth step of comparing at least one predefined altitude and an altitude of the aircraft altitude delivered by a radio-altimeter, in such a way that when the aircraft crosses the predefined altitude, the graphical state of the first symbol changes in relation to the second symbol, indicating the crossing of the at least one predefined altitude to the pilot.

* * * * *